United States Patent [19]
Yung et al.

[11] Patent Number: 5,721,868
[45] Date of Patent: Feb. 24, 1998

[54] RAPID REGISTER FILE ACCESS BY LIMITING ACCESS TO A SELECTABLE REGISTER SUBSET

[75] Inventors: Robert Yung, Fremont, Calif.; William N. Joy, Aspen, Colo.; Michael Allen, San Francisco; Marc Tremblay, Palo Alto, both of Calif.

[73] Assignee: Sun Microsystems, Inc., Mountain View, Calif.

[21] Appl. No.: 687,293

[22] Filed: Jul. 25, 1996

Related U.S. Application Data

[63] Continuation of Ser. No. 184,044, Jan. 21, 1994, abandoned.
[51] Int. Cl.⁶ .................................................. G06K 12/00
[52] U.S. Cl. .......................... 395/476; 395/492; 395/401
[58] Field of Search .............................. 395/800, 823, 395/401, 492; 365/230.02

[56] References Cited

U.S. PATENT DOCUMENTS

| | | | |
|---|---|---|---|
| 4,777,588 | 10/1988 | Case et al. | 395/823 |
| 4,777,589 | 10/1988 | Case et al. | 395/800 |
| 5,083,263 | 1/1992 | Joy et al. | 395/800 |
| 5,159,680 | 10/1992 | Joy et al. | 395/800 |
| 5,179,681 | 1/1993 | Jensen | 395/445 |
| 5,179,682 | 1/1993 | Jensen | 395/425 |
| 5,226,142 | 7/1993 | Vegesna et al. | 365/230.02 |
| 5,233,691 | 8/1993 | Ando et al. | 395/250 |
| 5,392,411 | 2/1995 | Ozaki | 395/401 |
| 5,437,043 | 7/1995 | Fujii et al. | 395/800 |
| 5,438,669 | 8/1995 | Nakazawa et al. | 395/563 |
| 5,440,714 | 8/1995 | Wang | 395/492 |

OTHER PUBLICATIONS

Ken Marrin, SPARC braces for battle, May 1992, Sun World, pp. 92–100.
Ken Marin, SPARC scales up, Jul. 1992, Sun World, pp. 82–88.

*Primary Examiner*—Tod R. Swann
*Assistant Examiner*—David Langjahr
*Attorney, Agent, or Firm*—Blakely Sokoloff Taylor & Zafman

[57] ABSTRACT

A register window file method and apparatus is disclosed. A register file is formed from a plurality of registers. The registers are grouped into a plurality of logical windows. Window selection logic selects among the logical windows and thereby limits access at any given time to the selected logical window. Because access is limited to only one window at a time, an individual register can be selected by specifying its virtual register number. Therefore, there is no need to translate from virtual address numbers to physical address numbers when accessing registers. This means that virtual register number to physical register number translation logic of the prior art is no longer required. Thus, the area on the integrated circuit chip formerly occupied by the translation logic is no longer required. Furthermore, the translation delays per instruction introduced by the translation logic are also eliminated. Moreover, each register only shares read and write lines with the other registers of its window. Therefore, the capacitive load associated with each bit line of the register file is significantly smaller than that of the prior art where each register shared bit lines with every other register of the register file. Because selection is made only among the registers of a single window, smaller, less powerful drivers and sense amplifiers are required to write and read data respectively to and from the register file.

17 Claims, 5 Drawing Sheets

RAPID REGISTER FILE ACCESS BY LIMITING ACCESS TO A SELECTABLE REGISTER SUBSET

This is a continuation of application Ser. No. 08/184,044 filed Jan. 21, 1994 now abandoned.

BACKGROUND OF THE INVENTION

1. Field of the Invention

The present invention relates to computer systems, and more particularly, to an apparatus and method for an arithmetic logic unit to access a register file in a microprocessor.

2. Art Background

A microprocessor chip contains an arithmetic logic unit (ALU) and a plurality of registers organized into a register file. With certain instructions, such as arithmetic, logic, or load/store instructions, the ALU will typically read data from one or more registers in the register file, perform the operation defined by the instruction, and then write the results back to one or more designated registers in the register file. Since this sequence occurs with virtually every instruction, the access time of the register file is of paramount importance to the overall data processing speed of the system.

Referring to FIG. 1, a block diagram of the register access circuitry according to the prior art is shown. The register access block diagram 300 includes an ALU 310, a register memory array 330, a virtual to physical address translator 320, a read data path 340 and a write data path 350. The read path 340 and the write path 350 are, respectively, coupled between the ALU 310 and the register memory array 330.

According to one example of the prior art, the register memory array 330 is a windowed register array, such as that used in the family of SPARC microprocessors, developed by Sun Microsystems, Inc., assignee of the present invention. In the various microprocessors in the SPARC family, there are anywhere from forty (40) to five hundred and twenty (520) registers. All of the SPARC microprocessors share a common register file organization. Eight (8) of the total number of registers are dedicated as global registers. The remaining registers are grouped in sets of sixteen (16). Of the sixteen registers per set, eight (8) are designated as LOCAL registers and eight (8) are designated as OUT registers. The register set is further organized into windows. Each window includes eight global registers, eight IN registers, eight LOCAL registers, and eight OUT registers. The windows are arranged such that the OUT registers of one window are physically the same registers as the IN registers of the adjacent window. The common registers, which are shared by two adjacent windows, have different virtual addresses, but in fact, have a common physical address in the register memory array. Furthermore, the same set of global registers is shared by every window. Accordingly, the number of physical registers is less than the number of virtual registers. For additional information on this topic, see the SPARC Architecture Manual, available from SPARC International, Menlo park, Calif.

Referring specifically to the register memory array 330, the individual registers $20_{(1)}$ through $20_{(m)}$ are typically SRAM arranged in a top down manner on the microprocessor chips. Each register $20_{(1)}$ through $20_{(m)}$ is (n) bits wide and includes (n) memory cells. Bit lines $22_{(1)}$–$22_{(n)}$ run the height of the memory array. One cell from each register $20_{(1)}$ through $20_{(m)}$ is coupled to a particular bit line and shares the particular bit line with each other similarly positioned memory cell. Thus, for example, the fifth memory cell from each register $20_{(1)}$ through $20_{(m)}$ is coupled to bit line $22_{(5)}$.

To simplify things, register memory array 330 is shown in FIG. 1 as having only one read port and only one write port. Typically, however, ALU 310 will read two (or more) words of data from register memory array 330 per instruction. If ALU 310 is a superscalar processor, it will be able to execute more than one instruction at a time, therefore register memory array 330 will typically have several read and write ports to support this capability. Furthermore, if ALU 310 is pipelined, i.e. it works on different parts of several instructions at the same time, then it may be the case that, at any given time, the window of registers from which ALU 310 is reading is not the same window of registers to which ALU 310 is writing. Therefore, at any given time in a pipelined processor, the current window pointer for reading the inputs for an instruction at the beginning of the execution pipeline from register memory array 330 may have a different value than the current window for writing the result of an instruction at the end of the execution pipeline to memory array 330.

In one embodiment there are 16 windows addressed as windows zero through 15. Each window can address 32 registers. The registers are addressed by the programmer using virtual register numbers that are independent of the current window. In this embodiment, the eight global registers are addressed as registers zero through seven. Similarly, the eight OUT registers are addressed as registers eight through 15, the eight local registers are addressed as registers 16 through 23 and the eight IN registers are addressed as registers 24 through 31. Because this embodiment has 16 windows, and further because each window can address 32 registers, it would appear that memory array 330 must have 512 registers. Due to the overlapping use of registers, however, there are less than 512 physical registers in memory array 330. In this example, there are eight global registers plus sixteen windows of registers (wherein there are eight local and eight IN/OUT registers per window) for a total of 264 actual physical registers in memory array 330.

Virtual to physical translator 320 provides the translation from virtual register numbers specified by the programmer to physical register numbers within memory array 330. Given a current window number (i.e. window zero through 15) and a virtual register number within the window (i.e. virtual register zero through 31), translator logic 320 provides a corresponding physical register number (i.e. physical register zero through 264). Note that, because there are 16 windows, a window can be specified by a four bit number ($2^4$=16). Further, because there are 32 registers within a window, a particular register within a window can be specified by a five bit virtual register number ($2^5$=32). Moreover, because there are 264 physical registers in memory array 330, a physical register can be specified by a nine bit physical register number ($2^9$=512, 512>264).

In one embodiment, virtual to physical translator 320 uses steering logic and adders to provide a translation. In this embodiment, memory array 330 is structured so that the first eight registers are the global registers. The next 256 registers of memory array 330 are then the window specific registers. These window specific registers are grouped within memory array 330 by ascending window number and further grouped within each window by ascending virtual register number. In this arrangement, if the virtual register number to be translated is that of a global register (i.e. zero through seven) then the physical register number provided by translation logic 320 will be the same as the virtual register number. If, on the other hand, the virtual register number to be translated is that of a window specific register, the virtual to physical register translation calculation performed by translator 320 is more complex. First translator 320 will left shift the current window pointer four places and then add the shifted current window pointer to the virtual register number to be translated. Finally, translator 320 will take the resulting sum and perform a modulo 256 operation to obtain the physical register number that corresponds to the virtual register number to be translated. Note that 256 is the number (16) of windows multiplied by the number (16) of actual physical registers within each window. In an embodiment having a different number of windows or registers within a window, the base of the modulo operation would be adjusted accordingly.

To read a register from register memory array 330, ALU 310 specifies the window of the register to be read and the virtual register number of the register to be read to translator logic 320 using the current window pointer (read) bus 365 and virtual register number (read) bus 360, respectively. Translator logic 320 then converts the window of the register to be read and the virtual register number of the register to be read to a physical register number and specifies this physical register number to memory array 330 using the physical register number (read) bus 370. Upon receiving the physical register number to read, the data contents of the individual memory cells of the register to be accessed are placed onto respective bit lines $22_{(1)}$ through $22_{(n)}$ and transferred to the ALU 310 by the read data path 340.

Similarly, to write to a register in memory array 330, functional unit 310 uses the current window pointer (write) bus 385 and virtual register number (write) bus 380 to specify to translator logic 320, the window and virtual register number of the register to be written to, respectively. Translator logic 320 then converts the window and virtual register number of the register to be written to into a physical register number and specifies this register to memory array 330 using the physical register number (write) bus 390. Upon receiving the physical register number of the register to be written to, memory array 330 receives the word of data from the functional unit 310 over the write data path 350. This word of data to be written is placed on bit lines $22_{(1)}$ through $22_{(n)}$ and is then stored in the memory cells of the specified register.

There are several problems associated with the prior art register file accessing arrangement. The virtual to physical translation time and the register memory array 330 access time are very slow. These two factors significantly impede the processor throughput of the computer system.

Whenever a register is read from or written to, there is a delay while translator logic 320 converts the current window pointer and virtual register number into a physical register number. Since a typical instruction specifies two registers to be read and one register to be written, there typically are three translations required per instruction, and each translation will introduce its own delay.

The bit lines $22_{(1)}$ through $22_{(n)}$ of the register memory array are very long and have a large capacitive load due to the number of cells coupled to each line. The greater the capacitive load on the bit lines, the longer it takes to read from, or write to, a particular register. Furthermore, the greater the capacitive load on a bit line, the larger the driver required to drive data to a register during a write operation and the larger the sense amplifier required to sense data output from a register during a read operation.

SUMMARY OF THE INVENTION

A register window file method and apparatus is disclosed. A register file is formed from a plurality of registers. The registers are grouped into a plurality of logical windows. Window selection logic selects among the logical windows and thereby limits access at any given time to the selected logical window.

Because access is limited to only one window at a time, an individual register can be selected by specifying its virtual register number. Therefore, there is no need to translate from virtual address numbers to physical address numbers when accessing registers. This means that virtual register number to physical register number translation logic of the prior art is no longer required. Thus, the area on the integrated circuit chip formerly occupied by the translation logic is no longer required. Furthermore, the translation delays per instruction introduced by the translation logic are also eliminated.

Moreover, each register only shares read and write lines with the other registers of its window. Therefore, the capacitive load associated with each bit line of the register file is significantly smaller than that of the prior art where each register shared bit lines with every other register of the register file. Because selection is made only among the registers of a single window, smaller, less powerful drivers and sense amplifiers are required to write and read data respectively to and from the register file.

BRIEF DESCRIPTION OF THE DRAWINGS

The objects, features, and advantages of the method and apparatus of the present invention will be apparent from the following detailed description of the invention in which.

DETAILED DESCRIPTION OF THE INVENTION

A method and apparatus is disclosed for implementing a windowed register file that advantageously permits only one window of registers to be read from at any given time, and that permits only one window of registers to be written to at a given time. In this way, the registers can be addressed directly using a virtual index number and each memory cell has relatively short read and write lines. Thus, accesses to registers of the register file are faster than to a similar sized register file of the prior art.

In the following description, for purposes of explanation, specific numbers, materials and configurations are set forth in order to provide a thorough understanding of the present invention. It will be apparent to one skilled in the art, however, that the present invention can be practiced without these specific details. In other instances, well known systems are shown in diagrammatic or block diagram form in order not to obscure the present invention unnecessarily.

Figure 1:
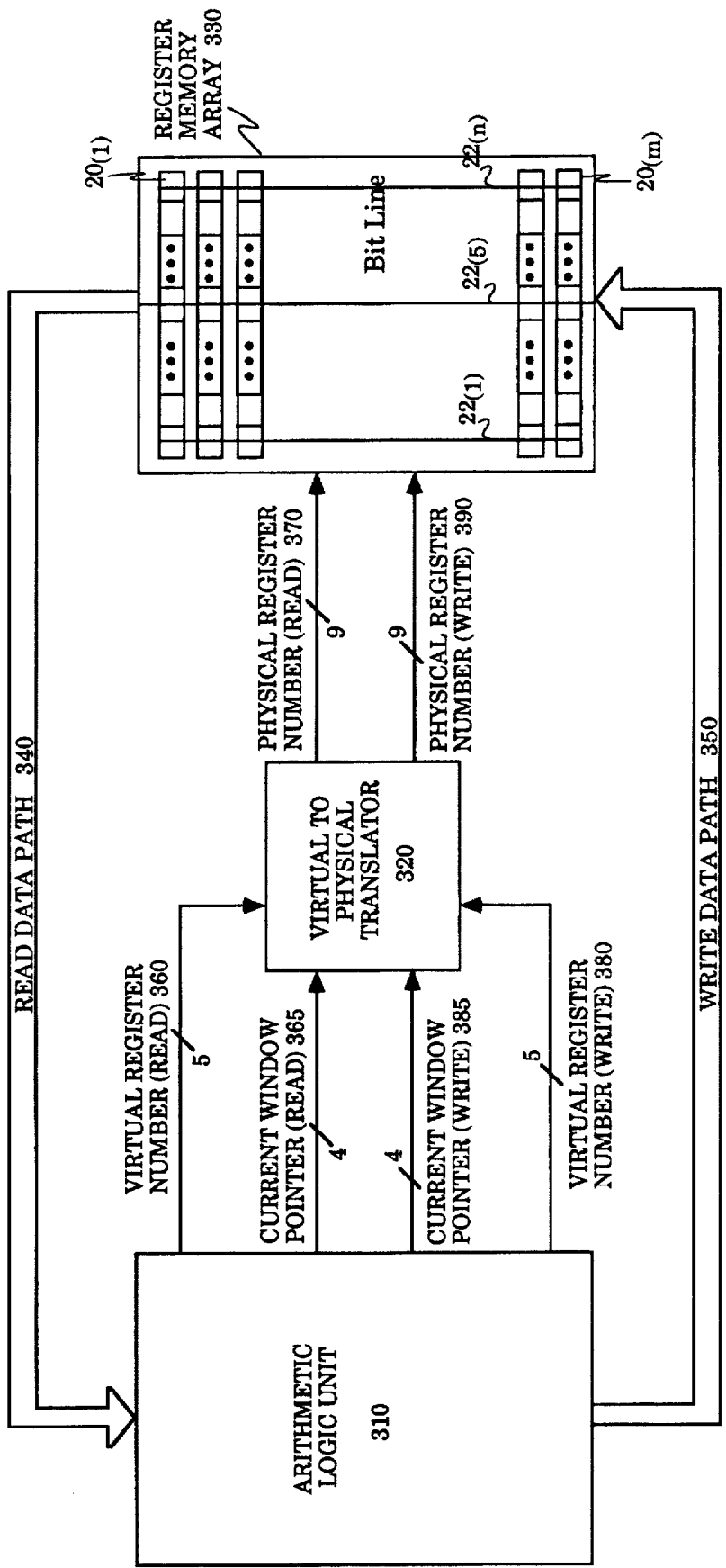
FIG. 1 illustrates a block diagram of an arithmetic logic unit that reads and writes data from a memory array of registers using SPARC register windows.
Figure 2:
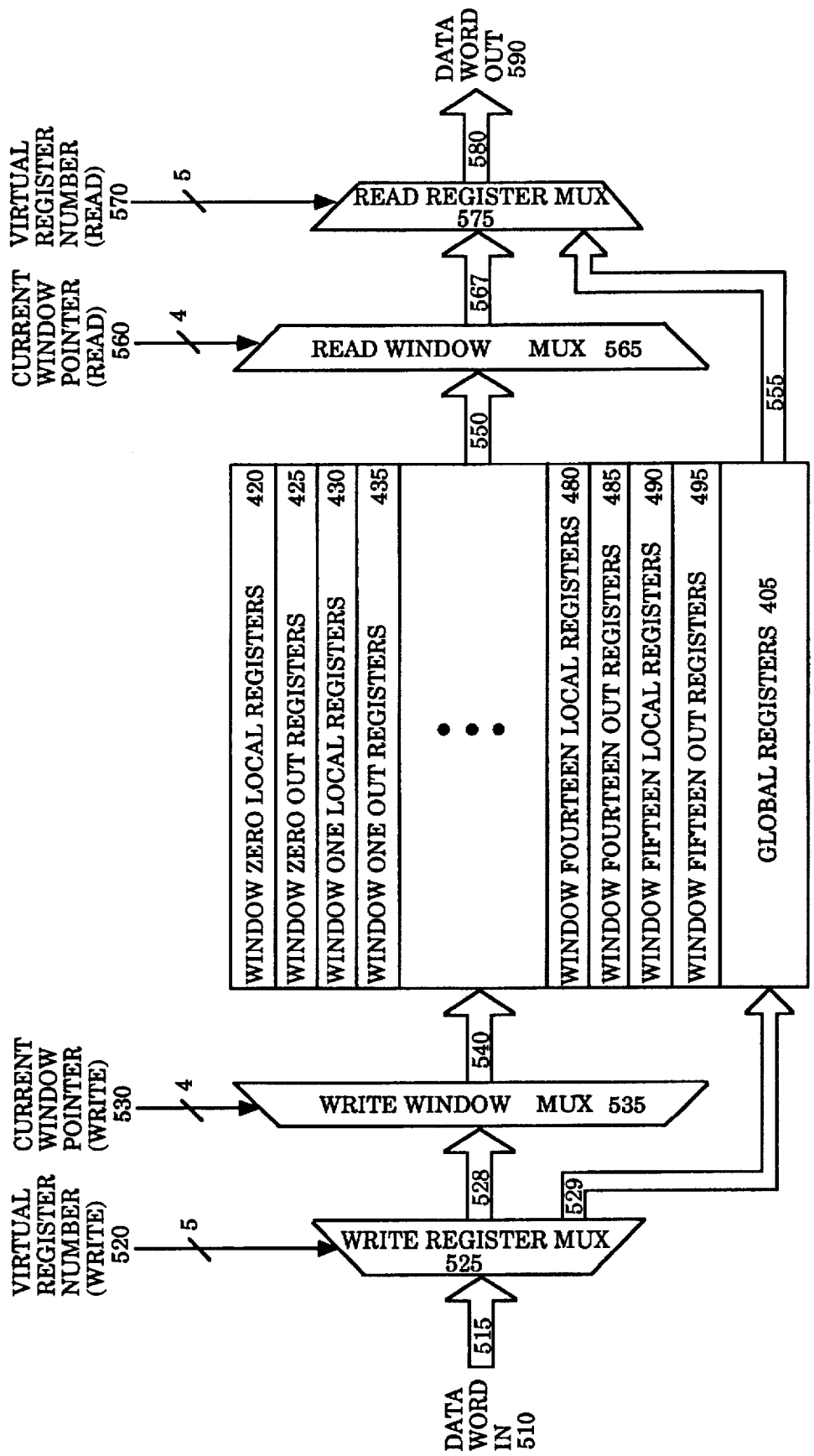
FIG. 2 illustrates the use of selectors to access only one window of registers at a time from an array of registers.

FIG. 2 illustrates the use of selectors to access only one window of registers at a time from an array of registers. In FIG. 2, global registers 405 and the non global registers (420, 425, 430, 435, 480, 485, 490, 495, etc.) together form a windowed register file. For simplicity, in the embodiment shown in FIG. 2, the windowed register file only has one read port and only has one write port.

The registers of the registered window file are physically grouped so that global registers 405 are located together and so that the non global register are also located together. Furthermore, the non global registers are physically grouped by window and, within each window, are grouped so that the local registers of a window are located together and so that the OUT registers of the window are also located together. Moreover, with the exception of window zero, the local registers of a window are physically "sandwiched" between the OUT registers of the window and the OUT windows of the logically preceding window.

As mentioned before, the IN registers of a window are physically the same as the OUT windows of the logically preceding window. Therefore, in the configuration of FIG. 2, the IN, local and OUT registers of each window are grouped together physically, with the exception of window zero. For example, window zero OUT registers 425 are the IN registers for window one. Accordingly the IN registers are not illustrated in the figure. Therefore, the non global registers of window one are formed by window zero OUT registers 425 (i.e. window one IN registers), window one local registers 430 and window one OUT registers 435.

The exceptional case of window zero is caused by the fact that the windows are arranged logically in a circular configuration but are represented physically as a rectangular array. Therefore, although window zero is logically adjacent to window fifteen, there is a physical discontinuity between them. Thus, although window fifteen OUT registers 495 are, in fact, the IN registers for window zero, window fifteen OUT registers 495 cannot be located physically adjacent to both window zero local registers 420 and window fifteen local registers 490.

FIG. 2 presents an embodiment wherein there are sixteen windows of registers and each window of registers is formed by eight global registers, eight local registers, eight IN registers and eight OUT registers. In alternate embodiments, the number of windows and the number of each type of register within a window are different from those presented in FIG. 2. In fact, in one alternate embodiment, there are no global registers, in another embodiment there are no local registers, and, in yet another embodiment, there are no IN/OUT registers. Furthermore, there is an embodiment where there are alternate sets of global registers, and a particular set of global registers is selected in a manner similar to that used to select among windows of non global registers. Moreover, there is an embodiment wherein the register sets of all of the windows that are not currently selected are placed in an energy saving power-down mode. There is, however, a concept that unites all of these embodiments. This concept is the ability to speed up access to individual registers by limiting the number of registers that can be accessed at a given time to a subset of the total number of registers available.

Although a register file such as that of FIG. 2 contains several windows of registers, only one window of registers (i.e. the current read window) is read from, and only one window of registers (i.e. the current write window) is written to, at any given time. Because fewer registers can be accessed at a given time, and because the registers that can be accessed at a given time are, for the most part, physically grouped together, the lines used to access the registers can be shorter and therefore present a lower capacitive load than found in prior art configurations. Therefore, the registers of a register file of the present invention can be accessed faster than the registers of a prior art register file having the same number of registers.

Furthermore, in the present invention, the registers being read from belong to the current read window and the registers being written to belong to the current write window. Therefore, the current read and write window can be made implicit to window selection logic thereby permitting the physical register number specified in an access to be the same as the virtual register number specified in an instruction causing the access. This permits faster accesses to registers than in the prior art because the step of translating the window and virtual register number into a physical register number is eliminated.

In FIG. 2, a data word to be written to the windowed register file is presented as DATA WORD IN 510 to write register multiplexer (mux) 525 on bus 515. Each input and output of window register mux 525 is one word wide. Write register mux 525 is a multiplexer that has one input and as many outputs as there are logical registers in a window. A signal placed on control bus virtual register number (write) 520 selects the output of write register mux 525. In an embodiment where each window has 32 logical registers, virtual register (write) 520 will be a five bit ($2^5=32$) control line that provides to write register mux 525 the five bit virtual register number of the register to be written to. In this example embodiment, if there are eight global registers, a value of 0 through 7 placed on virtual register number (write) control 520 will cause DATA WORD IN 510 to be presented on output bus 529 to the appropriate register of global registers 405. If, however, a value of 8 through 31 is placed on virtual register (write) control 520, DATA WORD IN 510 will be presented to the appropriate one of 24 inputs to write window mux 535.

Write window mux 535 has one input for every non global register of a window. For each input to write window mux 535, conceptually, there are as many outputs as there are windows. Thus, in an embodiment where there are 16 windows and every window has 24 non global registers, write window mux 535 will have 24 inputs and will conceptually have 384 (16 windows * 24 non global registers per window=384) outputs. In actuality, however, because the IN registers of a window are physically the same as the OUT registers of the logically preceding window, these outputs can be combined. Therefore, in an embodiment where there are 24 non global registers in a window and these registers are divided into eight IN registers, eight local registers and eight OUT registers, write window mux 535 will in actuality only have 256 outputs (16 windows * (8 local+8 IN/OUT) registers per window=256).

The control signal current window pointer (write) 530 controls write window mux 535 so that each input to write window mux 535 is channeled to the appropriate output for the current write window. Thus, continuing the example where there are sixteen windows, current window pointer (write) 530 will be a four bit signal used to select among the sixteen windows. In an example where the current write window is window three, write window mux 535 will channel eight of its inputs to the eight OUT registers of window three, eight of its inputs to the eight local registers of window three and eight of its inputs to the OUT registers of the logically preceding window (i.e. window two). The eight OUT registers of the logically preceding window are then addressed as the eight IN registers of the current write window. Write window mux 535 will remain set to window three until the current write window is changed, either to the next logically successive window (i.e. window four) through the execution of a SAVE command or to the next logically preceding window (i.e. window two) through the execution of a RESTORE command.

Selection for reading among the registers of the windowed register file is similar to, but a mirror image of, the selection for writing. Control signal current window pointer (read) 560 has a similar control function for read window mux 565 as control signal current window pointer (write) 530 does for write window mux 535. Read window mux 565 has as many inputs 550 as write window mux 535 has outputs 540. Furthermore, read window mux 565 has as many outputs 567 as write window mux 535 has inputs 528. Thus, write window mux 535 is used to fan an input out to one of several registers of non global registers 410 based upon the current write window, and read window mux 565 is used to select an output from one of several registers of non global registers 410 based upon the current read window.

Control signal virtual register number (read) 570 has a similar control function for read register mux 575 as control signal register number (write) 520 does for write register mux 525. Read register mux 575 has as many inputs (567 and 555) as write register mux 525 has outputs (529 and 528). Furthermore, read register mux 575 has a single output 580 and write register mux 525 has a single input 515. Thus, write register mux 525 is used to fan a single input out to one of several registers of a window based upon the virtual register number (write) 520, and read register mux 575 is used to select a single output from one of several registers of a window based upon the virtual register number (read) 570.

Although FIG. 2 depicts an embodiment wherein non global registers are physically grouped by window, it is possible to group the registers differently. In an alternate embodiment, the non global registers are arranged so that all similar registers of every window are physically grouped together. Thus, for example, the set of first local registers of every window would be followed by the set of next local registers of every window and this arrangement would continue on through to a group of registers consisting of the set of last OUT registers for every window. This alternate organization of the registers permits read and write lines to be shared among similar registers of every window while also permitting the use of a minimum length line for each shared line.

Figure 3:
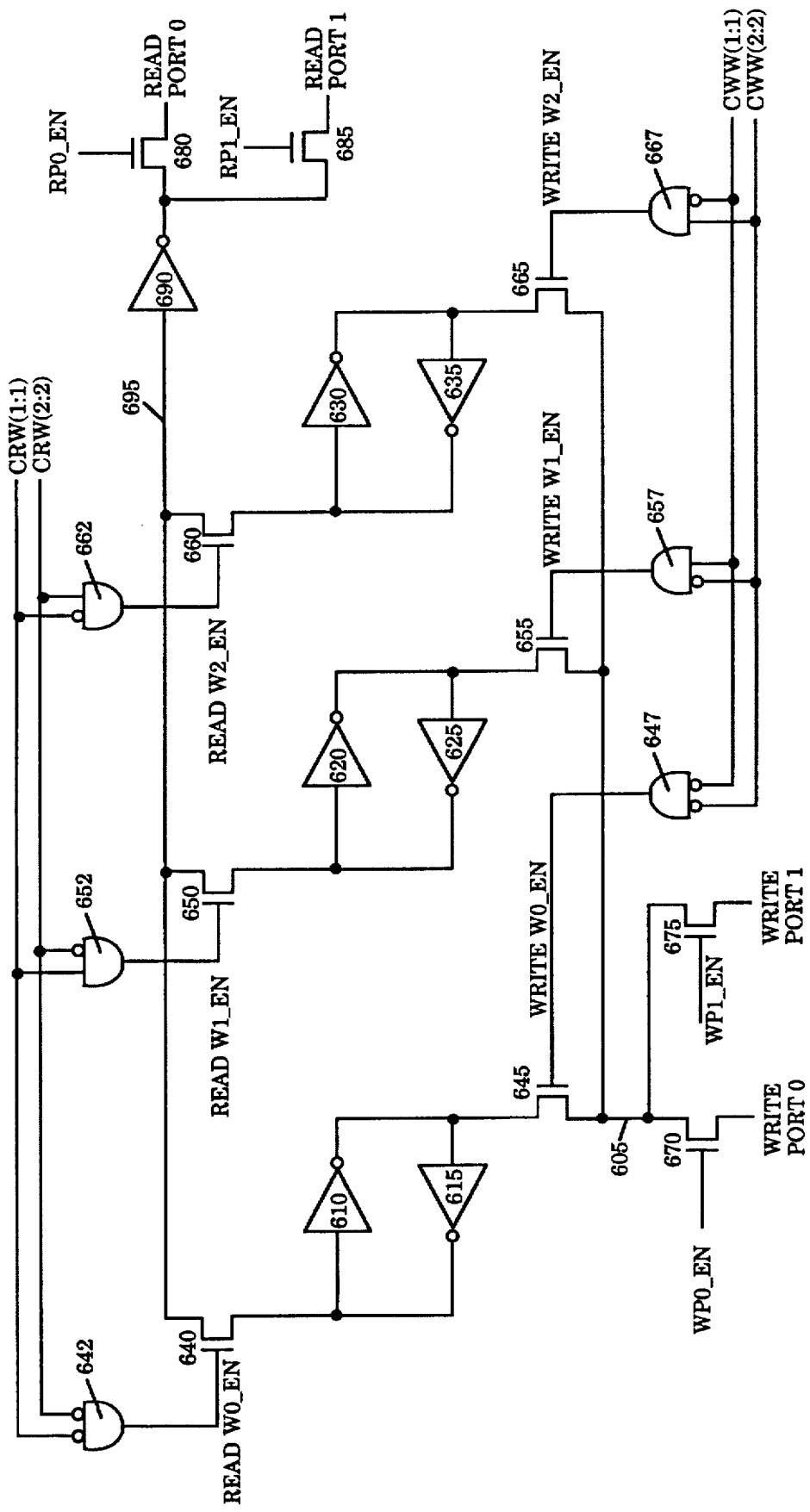
FIG. 3 illustrates the sharing among registers of different windows of a read line having multiple read ports and the sharing among registers of different windows of a write line having multiple write ports.

FIG. 3 illustrates the sharing of read and write lines among registers of different windows. FIG. 3 also illustrates the provision of multiple read ports for a shared read line and the provision of multiple write ports for a shared write line. FIG. 3 is a highly simplified version of FIG. 3 wherein there are only three windows, and each window is comprised of a single one bit register. In FIG. 3, the buffer and inverter pair 610 and 615 together form a single bit cell that is the single bit register for window zero. Similarly, the buffer and inverter pair 620 and 625 together form a single bit cell that is the single bit register for window one and the buffer and inverter pair 630 and 635 together form a single bit cell that is the single bit register for window two.

Buffer and inverter 690 acts as a sense amp and is coupled to each single bit cell by shared read line 695. Specifically, the single bit cell (formed by buffer and inverters 610 and 615) for window zero is coupled to shared read line 695 by transistor 640. When the current read window is window zero, the signal READ W0_EN is asserted and turns on transistor 640 thereby enabling the bit value stored in the single bit cell for window zero to be provided to sense amp 690 over shared read line 695. Furthermore, the single bit cell (formed by buffer and inverters 620 and 625) for window one is coupled to shared read line 695 by transistor 650. When the current read window is window one, the signal READ W1_EN is asserted and turns on transistor 650 thereby enabling the bit value stored in the single bit cell for window one to be provided to sense amp 690 over shared read line 695. Finally, the single bit cell (formed by buffer and inverters 630 and 635) for window two is coupled to shared read line 695 by transistor 660. When the current read window is window two, the signal READ W2_EN is asserted and turns on transistor 660 thereby enabling the bit value stored in the single bit cell for window two to be provided to sense amp 690 over shared read line 695. Thus, by exploiting the fact that only one window will be read at a particular time, a single read line 695 can be shared between several memory cells. Note that sense amp 690 is also shared by several bit cells thereby eliminating the need to provide a separate sense amp for each memory cell. In an alternate embodiment, the shared wire length is further reduced by adding bit interleaving to the RAM organization.

AND gates 642, 652 and 662 together form decoder logic for the current read window and ensure that at most one transistor of transistors 640, 650 and 660 will be enabled at a given time. Therefore, only one bit cell, i.e. that of the selected read window, will be read by shared read line 695 at a given time. In FIG. 3, the current read window can be encoded as a two bit signal ($2^2=4$) because there are only three possible read windows. Signals CRW (2:2) and CRW (1:1) are, respectively, the most and least significant bits of the current read window. Thus it can be seen that when the current read window is zero (00 in binary), signal READ W0_EN (output from AND gate 642) will be asserted and transistor 640 will be turned on. Furthermore, when the current read window is one (01 in binary), signal READ W1_EN (output from AND gate 652) will be asserted and transistor 650 will be turned on. Finally, when the current read window is two (10 in binary), signal READ W2_EN (output from AND gate 662) will be asserted and transistor 660 will be turned on.

In FIG. 3, sense amp 690 is coupled to two read ports. Specifically, sense amp 690 is coupled to READ PORT 0 by transistor 680 and sense amp 690 is coupled to READ PORT 1 by transistor 685. Thus, one can read the output of sense amp 690 through READ PORT 0 by asserting the signal RP0_EN to turn on transistor 680. On the other hand, one can read the output of sense amp 690 through READ PORT 1 by asserting the signal RP1_EN to turn on transistor 685. Additional read ports can be added to FIG. 3 by coupling additional transistors to sense amp 690 in parallel with transistors 680 and 685. Because the current window register is not changed frequently, the value of the register, in this case a single bit, is available at the output of sense amp 690, further reducing the time to read its value.

In FIG. 3, writing is accomplished in a manner similar to that of reading with the exception that writing does not require the use of a sense amp such as sense amp 690. Specifically, the single bit cell (formed by buffer and inverters 610 and 615) for window zero is coupled to shared write line 605 by transistor 645. When the current write window is window zero, the signal WRITE W0_EN is asserted and turns on transistor 645 thereby enabling the storing in the single bit cell for window zero of a single bit value provided over shared write line 605. Furthermore, the single bit cell (formed by buffer and inverters 620 and 625) for window one is coupled to shared write line 605 by transistor 655. When the current write window is window one, the signal WRITE W1_EN is asserted and turns on transistor 655 thereby enabling the storing in the single bit cell for window one of a bit value provided over shared write line 605. Moreover, the single bit cell (formed by buffer and inverters 630 and 635) for window two is coupled to shared write line 605 by transistor 665. When the current write window is window two, the signal WRITE W2_EN is asserted and turns on transistor 665 thereby enabling the storing in the single bit cell for window two of a bit value provided over shared write line 605. Thus, by exploiting the fact that only one window will be written at a particular time, a single write line 605 can be shared between several memory cells.

AND gates 647, 657 and 667 together form decoder logic for the current write window and ensure that at most one transistor of transistors 645, 655 and 665 will be enabled at a given time. Therefore, only one bit cell, i.e. that of the selected write window, will be written to at a given time using shared write line 605. In FIG. 3, the current write window can be encoded as a two bit signal ($2^2=4$) because there are only three possible write windows. Signals CWW (2:2) and CWW (1:1) are, respectively, the most and least significant bits of the current write window. Thus it can be seen that when the current write window is zero (00 in binary), signal WRITE W0_EN (output from AND gate 647) will be asserted and transistor 645 will be turned on. Furthermore, when the current write window is one (01 in binary), signal WRITE W1_EN (output from AND gate 657) will be asserted and transistor 655 will be turned on. Finally, when the current write window is two (10 in binary), signal WRITE W2_EN (output from AND gate 667) will be asserted and transistor 665 will be turned on.

In FIG. 3, shared write line 605 is coupled to two write ports. Specifically, shared write line 605 is coupled to WRITE PORT 0 by transistor 670 and shared write line 605 is coupled to WRITE PORT 1 by transistor 675. Thus, one can write through WRITE PORT 0 by asserting the signal WP0_EN to turn on transistor 670. On the other hand, one can write through WRITE PORT 1 by asserting the signal WP1_EN to turn on transistor 675. Additional write ports can be added to FIG. 3 by coupling additional transistors to shared write line 605 in parallel with transistors 670 and 675.

Comparing FIG. 2 with FIG. 3, it can be seen that the bit cells of FIG. 3 correspond to the non global registers of FIG. 2. Transistors 640, 650 and 660 and AND gates 642, 652 and 662 of FIG. 3 correspond to read window mux 565 of FIG. 2. Transistors 645, 655 and 665 and AND gates 647, 657 and 667 of FIG. 3 correspond to write window mux 535 of FIG. 2. This correspondence is because, based upon the selected read window, only one bit cell can be read from at a time, and, based upon the selected write window, only one bit cell can be written to at a time. There are no components in FIG. 3 that are used to select a specific register within a window and therefore correspond to read register mux 575 or to write register mux 525 of FIG. 2. This is because of the highly simplified nature of FIG. 3 wherein there is only a single one bit register per window.

Figure 4:
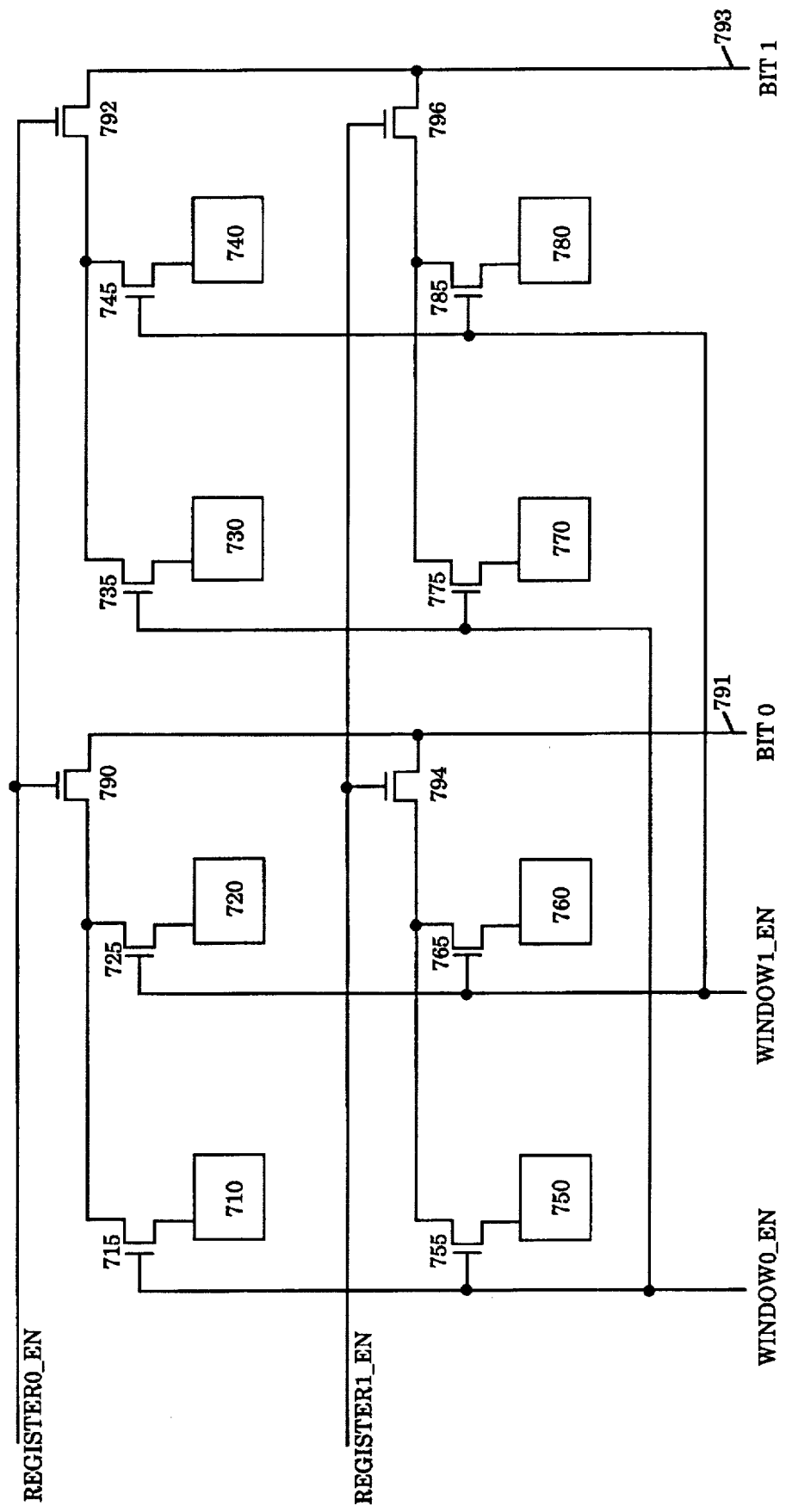
FIG. 4 illustrates the selection of a current window of registers and the selection of different registers within the current window.

FIG. 4 illustrates a more complex embodiment of the present invention wherein there are two windows in the register file, each window has two registers and each register stores two bits. Unnecessary detail has been eliminated from FIG. 4 to highlight the concepts of selection between windows and registers within a selected window. Therefore, in FIG. 4, rather than showing single bit cells as buffer and inverter pairs, each single bit cell is shown in block diagram form (i.e. blocks 710, 720, 730, 740, 750, 760, 770 and 780). Furthermore, because of the symmetry between reading and writing, only the write selection logic is shown. Decoding and multiple port selection logic are also not shown in FIG. 4.

In FIG. 4, each register is a two bit register, therefore each register is formed by two single bit storage cells, one single bit storage cell stores the least significant bit of the register (i.e. bit zero) and one single bit storage cell stores the most significant bit (i.e. bit one). Thus, block 710 is a single bit storage cell that stores bit zero of register zero for window zero and block 730 is a single bit storage cell that stores the corresponding bit one. Blocks 720 and 740 together form register zero of window one with block 720 storing bit zero and block 740 storing bit one. Similarly, block 750 is a single bit storage cell that stores bit zero of register one for window zero and block 770 is a single bit storage cell that stores the corresponding bit one. Blocks 760 and 780 together form register one of window one with block 760 storing bit zero and block 780 storing bit one.

Comparing FIG. 2 with FIG. 4, it can be seen that the bit cells (i.e. blocks 710, 720, 730, 740, 750, 760, 770 and 780) of FIG. 4 correspond to the non global registers 410 of FIG. 2. Transistors 715, 725, 735, 745, 755, 765, 775 and 785 of FIG. 4 correspond to write window mux 535 of FIG. 2. Transistors 790, 792 and 794 and 798 of FIG. 4 correspond to write register mux 525 of FIG. 2. Therefore, based upon the selected write window and the selected register within the selected write window, only one register can be written to at a time. This is best illustrated by example.

In the case where the current write window is window zero, the signal WINDOW0_EN would be asserted and the signal WINDOW1_EN would not be asserted. Therefore, transistors 715, 755, 735 and 775 would be turned on and transistors 725, 765, 745 and 785 would be turned off. If register zero of window zero was to be written to, then signal REGISTR0_EN would be asserted and signal REGISTR1_EN would not be asserted. This would cause transistors 790 and 792 to be turned on and transistors 794 and 796 to be turned off. Therefore, the BIT 0 value on shared write line 791 would be stored in block 710 and the BIT 1 value on shared write line 793 would be stored in block 730. If one then wanted to write to register one of window zero, signal REGISTR1_EN would be asserted and signal REGISTR0_EN would not be asserted. This would cause transistors 794 and 796 to be turned on and transistors 790 and 792 to be turned off. Therefore, the BIT 0 value on shared write line 791 would be stored in block 750 and the BIT 1 value on shared write line 793 would be stored in block 770.

In the case where the current write window changes to window one, the signal WINDOW1_EN would be asserted and the signal WINDOW0_EN would not be asserted. Therefore, transistors 725, 765, 745 and 785 would be turned on and transistors 715, 755, 735 and 775 would be turned off. If register zero of window one was to be written to, then signal REGISTR0_EN would be asserted and signal REGISTR1_EN would not be asserted. This would cause transistors 790 and 792 to be turned on and transistors 794 and 796 to be turned off. Therefore, the BIT 0 value on shared write line 791 would be stored in block 720 and the BIT 1 value on shared write line 793 would be stored in block 740. If one then wanted to write to register one of window one, signal REGISTR1_EN would be asserted and signal REGISTR0_EN would not be asserted. This would cause transistors 794 and 796 to be turned on and transistors 790 and 792 to be turned off. Therefore, the BIT 0 value on shared write line 791 would be stored in block 760 and the BIT 1 value on shared write line 793 would be stored in block 780.

Figure 5:
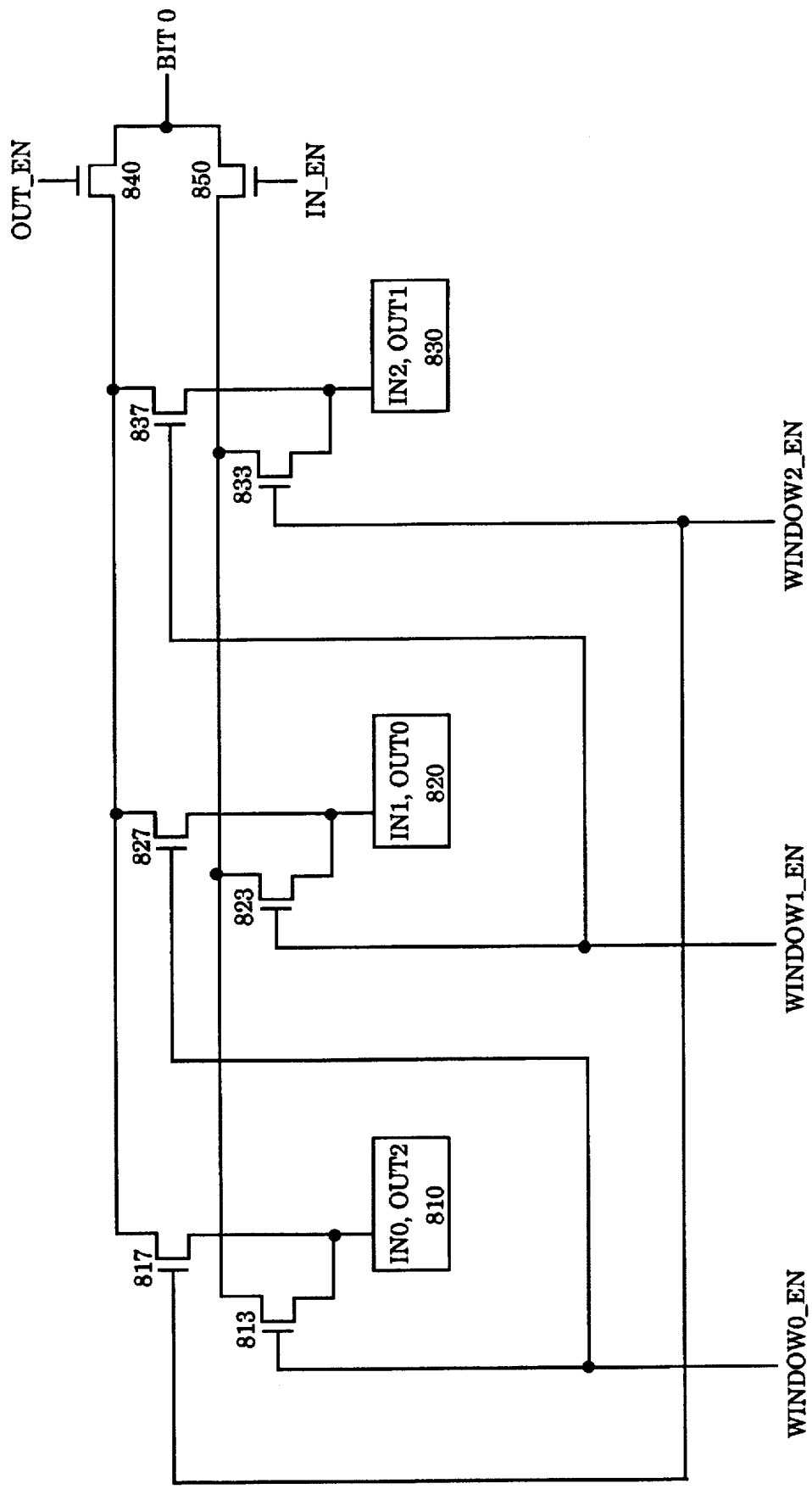
FIG. 5 illustrates the accessing of the IN register of a window as the OUT register of a logically preceding window.

In FIG. 4, the registers function as though they are local registers because each register can only be accessed in a single window. FIG. 5 illustrates a technique for addressing an IN register of one window as an OUT register of a logically preceding window. Once again, unnecessary detail has been eliminated from FIG. 5 to highlight the concept of the treatment of a register as an IN register in one window and as an OUT register in another window in a context where the registers of only one window are active at a time. Therefore, in FIG. 5, rather than showing single bit cells as buffer and inverter pairs, each single bit cell is shown in block diagram form (i.e. blocks 810, 820 and 830). Furthermore, because of the symmetry between reading and writing, only the write selection logic is shown. Decoding and multiple port selection logic are also not shown in FIG. 5.

In the example of FIG. 5 there are three windows (i.e. window 0, window 1 and window 2), each window has two registers (i.e. an IN register and an OUT register) and each register stores only a single bit. The IN register of a window is the OUT register of the logically preceding window. In a three window example such as that of FIG. 5, window 2 logically precedes window 0, window 0 logically precedes window 1 and window 1 logically precedes window 2. Therefore, in FIG. 5, block 810 is treated as the IN register of window 0 when the current write window is window 0 and is treated as the OUT register of window 2 when the current write window is window 2. Furthermore, block 820 is treated as the IN register of window 1 when the current write window is window 1 and is treated as the OUT register of window 0 when the current write window is window 0. Finally, block 830 is treated as the IN register of window 2 when the current write window is window 2 and is treated as the OUT register of window 1 when the current write window is window 1.

In the example of FIG. 5, when the current write window is window 0, the signal WINDOW0_EN will be asserted and the signals WINDOW1_EN and WINDOW2_EN will not be asserted. Therefore, when the current write window is window 0, transistors 813 and 827 (controlled by WINDOW0_EN) are turned on and transistors 823 and 837 (controlled by WINDOW1_EN) and transistors 833 and 817 (controlled by WINDOW2_EN) are turned off. When the current write window is window 0, the IN register of window 0 is accessed by asserting the signal IN_EN and not asserting the signal OUT_EN. This causes transistor 850 (controlled by IN_EN) to be turned on and transistor 840 (controlled by OUT_EN) to be turned off. Therefore, whatever value BIT 0 has will be stored in block 810. Conversely, when the current write window is window 0, the OUT register of window 0 is accessed by asserting the signal OUT_EN and not asserting the signal IN_EN. This causes transistor 840 (controlled by OUT_EN) to be turned on and transistor 850 (controlled by IN_EN) to be turned off. Therefore, whatever value BIT 0 has will be stored in block 820.

Furthermore, when the current write window is window 1, the signal WINDOW1_EN will be asserted and the signals WINDOW2_EN and WINDOW0_EN will not be asserted. Therefore, when the current write window is window 1, transistors 823 and 837 (controlled by WINDOW1_EN) are turned on and transistors 833 and 817 (controlled by WINDOW2_EN) and transistors 813 and 827 (controlled by WINDOW0_EN) are turned off. When the current write window is window 1, the IN register of window 1 is accessed by asserting the signal IN_EN and not asserting the signal OUT_EN. This causes transistor 850 (controlled by IN_EN) to be turned on and transistor 840 (controlled by OUT_EN) to be turned off. Therefore, whatever value BIT 0 has will be stored in block 820. Conversely, when the current write window is window 1, the OUT register of window 1 is accessed by asserting the signal OUT_EN and not asserting the signal IN_EN. This causes transistor 840 (controlled by OUT_EN) to be turned on and transistor 850 (controlled by IN_EN) to be turned off. Therefore, whatever value BIT 0 has will be stored in block 830.

Finally, when the current write window is window 2, the signal WINDOW2_EN will be asserted and the signals WINDOW0_EN and WINDOW1_EN will not be asserted. Therefore, when the current write window is window 2, transistors 833 and 817 (controlled by WINDOW2_EN) are turned on and transistors 813 and 827 (controlled by WINDOW0_EN) and transistors 823 and 837 (controlled by WINDOW2_EN) are turned off. When the current write window is window 2, the IN register of window 2 is accessed by asserting the signal IN_EN and not asserting the signal OUT_EN. This causes transistor 850 (controlled by IN_EN) to be turned on and transistor 840 (controlled by OUT_EN) to be turned off. Therefore, whatever value BIT 0 has will be stored in block 830. Conversely, when the current write window is window 2, the OUT register of window 2 is accessed by asserting the signal OUT_EN and not asserting the signal IN_EN. This causes transistor 840 (controlled by OUT_EN) to be turned on and transistor 850 (controlled by IN_EN) to be turned off. Therefore, whatever value BIT 0 has will be stored in block 810.

While the method and apparatus of the present invention has been described in terms of its presently preferred and alternate embodiments, those skilled in the art will recognize that the present invention may be practiced with modification and alternation within the spirit and scope of the appended claims. The specifications and drawings are, accordingly, to be regarded in an illustrative rather than a restrictive sense.

What is claimed is:

1. A register file apparatus allowing access to a register file without the need for translation from a virtual register number to a physical register number, comprising:

a plurality of registers, the registers being grouped into a plurality of logical windows;

first window selection logic, the first window selection logic for selecting among the logical windows and thereby limiting access at any given time to a first selected logical window; and first register selection logic, the first register selection logic for directly selecting among registers of the first selected logical window by virtual register number.

2. The apparatus as set forth in claim 1 wherein the first selected logical window is accessed by writing, the apparatus further comprising:

second window selection logic, the second window selection logic for selecting among the logical windows and thereby limiting access at any given time to a second selected logical window, the second selected logical window being accessed by reading.

3. The apparatus as set forth in claim 2 further comprising:

first register selection logic, the first register selection logic for selecting among registers of the first selected logical window; and second register selection logic, the second register selection logic for selecting among registers of the second selected logical window.

4. The apparatus as set forth in claim 1 further comprising at least one global register that can be accessed at any given time.

5. The apparatus as set forth in claim 1 wherein the windows are arranged logically such that a given window has a predecessor window that logically precedes the given window and further wherein at least one register of the plurality of registers is common to the given window and to the predecessor window.

6. The apparatus as set forth in claim 5 wherein the at least one common register is treated as an IN register in the given window and as an OUT register in the predecessor window.

7. The apparatus as set forth in claim 5 wherein the first selected window changes from the given window to the predecessor window during a DECREMENT operation and from the predecessor window to the given window during an INCREMENT operation.

8. A register file access method allowing access to a register file without the need for translation from a virtual register number to a physical register number, comprising the steps of:

provinding a plurality of registers that together form a register file;

grouping the registers into a plurality of logical windows;

selecting among the logical windows and thereby limiting access at any given time to a first selected logical window; and directly selecting a first access register from among the registers of the first selected logical window by virtual register number.

9. The method as set forth in claim 8 wherein the first selected logical window is accessed by writing, the method further comprising the step of:

selecting among the logical windows and thereby limiting access at any given time to a second selected logical window, the second selected logical window being accessed by reading.

10. The method as set forth in claim 9 further comprising the steps of:

selecting a first access register from among the registers of the first selected logical window; and selecting a second access register from among the registers of the second selected logical window.

11. The method as set forth in claim 8 further comprising the steps of:

providing at least one global register; and accessing the global register at any given time as needed.

12. The method as set forth in claim 8 wherein the windows are arranged logically such that a given window has a predecessor window that logically precedes the given window and further wherein at least one register of the plurality of registers is common to the given window and to the predecessor window and is treated as an IN register in the given window and as an OUT register in the predecessor window, the method further comprising the steps of:

changing the first selected window from the given window to the predecessor window during a DECREMENT operation; and changing from the predecessor window to the given window during an INCREMENT operation.

13. A register file apparatus allowing access to a register file without the need for translation from a virtual register number to a physical register number, comprising:

a plurality of registers the registers being grouped into a plurality of logical windows;

write window selection logic, the write window selection logic for selecting among the logical windows and thereby limiting write access at any given time to a selected write window of the logical windows;

read window selection logic, the read window selection logic for selecting among the logical windows and thereby limiting read access at any given time to a selected read window of the logical windows;

read register selection logic, the read register selection logic for directly selecting a read register to read from among the registers of the selected read window by virtual register number; and write register selection logic, the write register selection logic for directly selecting a write register to write to from among the registers of the selected write window by virtual register number.

14. The apparatus as set forth in claim 13 further comprising at least one global register that can be accessed regardless of the selected read and write window.

15. The apparatus as set forth in claim 13 wherein the windows are arranged logically such that a given window has a predecessor window that logically precedes the given window and further wherein at least one register of the plurality of registers is common to the given window and to the predecessor window.

16. The apparatus as set forth in claim 15 wherein the at least one common register is treated as an IN register in the given window and as an OUT register in the predecessor window.

17. The apparatus as set forth in claim 15 wherein a selected window changes from the given window to the predecessor window during a DECREMENT operation and from the predecessor window to the given window during an INCREMENT operation.

* * * * *